United States Patent
Auten et al.

(10) Patent No.: US 10,037,077 B2
(45) Date of Patent: Jul. 31, 2018

(54) SYSTEMS AND METHODS OF GENERATING AUGMENTED REALITY EXPERIENCES

(71) Applicant: DISNEY ENTERPRISES, INC., Burbank, CA (US)

(72) Inventors: Robert Auten, Burbank, CA (US); Malcolm E. Murdock, Burbank, CA (US); Joshua Nakaya, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 41 days.

(21) Appl. No.: 15/188,811

(22) Filed: Jun. 21, 2016

(65) Prior Publication Data

US 2017/0365098 A1 Dec. 21, 2017

(51) Int. Cl.
*G09G 5/00* (2006.01)
*G06F 3/01* (2006.01)
*G06T 19/00* (2011.01)

(52) U.S. Cl.
CPC ............ *G06F 3/011* (2013.01); *G06T 19/006* (2013.01)

(58) Field of Classification Search
CPC .................................................. G06T 19/006
See application file for complete search history.

(56) References Cited

U.S. PATENT DOCUMENTS

| | | | |
|---|---|---|---|
| 8,643,676 B2 | 2/2014 | Matsui | |
| 8,825,087 B2 | 9/2014 | Hamill | |
| 8,963,805 B2 | 2/2015 | Sugden | |
| 9,035,970 B2 | 5/2015 | Lamb | |
| 2006/0105838 A1 | 5/2006 | Mullen | |
| 2009/0033588 A1 | 2/2009 | Kajita | |
| 2010/0103196 A1 | 4/2010 | Kumar | |
| 2010/0253700 A1 | 10/2010 | Bergeron | |
| 2011/0310120 A1 | 12/2011 | Narayanan | |
| 2012/0025976 A1 | 2/2012 | Richey | |
| 2013/0125027 A1 | 5/2013 | Abovitz | |
| 2013/0174213 A1 | 7/2013 | Liu | |
| 2013/0335405 A1 | 12/2013 | Scavezze | |
| 2014/0058825 A1 | 2/2014 | Raman | |

(Continued)

OTHER PUBLICATIONS

Langlotz et al., Sketching Up the World: In Situ Authoring for Mobile Augmented Reality, Personal and Ubiquitous Computing, vol. 16, Issue 6, Aug. 2012, pp. 623-630.*

(Continued)

*Primary Examiner* — Charles Tseng
(74) *Attorney, Agent, or Firm* — Sheppard Mullin Richter & Hampton LLP (57) ABSTRACT

This disclosure relates to system and methods for providing users with augmented reality experiences based on a specific location of a user. An augmented reality experience may include augmented reality objects, and/or other content. Augmented reality objects may be associated with one or more real-world locations. Requests for augmented reality experience may include identifications of real-world locations of client computing devices, and/or other information. An instance of an augmented reality object may be overlaid onto visual information obtained from client computing devices. An interaction between users and/or users and one or more augmented reality objects may be facilitated.

24 Claims, 5 Drawing Sheets

(56) References Cited

U.S. PATENT DOCUMENTS

| | | | |
|---|---|---|---|
| 2015/0032823 A1 | 1/2015 | Miller | |
| 2015/0109338 A1* | 4/2015 | McKinnon | G06F 17/30244 345/633 |
| 2015/0138234 A1* | 5/2015 | Yoon | G06F 17/30265 345/633 |
| 2015/0206350 A1* | 7/2015 | Gardes | G06F 3/0346 345/619 |
| 2015/0268717 A1 | 9/2015 | Schlumberger | |
| 2015/0348329 A1* | 12/2015 | Carre | G06Q 30/02 345/633 |

OTHER PUBLICATIONS

Nadia, et al, "Virtual Worlds and Augmented Reality in Cultural Heritage Applications" Retreived from: http://citeseerx.ist.psu.edu/viewdoc/download?doi=10.1.1.106.9743&rep=rep1&type=pdf dated Oct. 13, 2015 (11 pages).

* cited by examiner

SYSTEMS AND METHODS OF GENERATING AUGMENTED REALITY EXPERIENCES

FIELD

The disclosure relates to systems and methods for generating augmented reality experiences.

BACKGROUND

It is known that augmented reality is a view of a physical, real-world location that has been augmented by computer-generated sensory input including one or more of sound, video, and/or graphics. In an augmented reality system, a user's view of the real world is enhanced with computer-generated sensory input. These graphics are spatially registered so that they appear aligned with the real world from the perspective of the viewing user.

SUMMARY

One or more aspects of the present disclosure relates to an augmented reality system configured to augment a user's view of the real world with virtual computer-generated graphics and/or other information. These graphics may appear aligned with the real world from the perspective of the viewing user. For example, a virtual character and/or augmented reality objects may appear to be standing on a real-world staircase. Users may interact with virtual characters and/or other augmented reality objects via computing devices associated with the users. The computing devices may include one or more of mobile electronic devices, smart phones, tablet PCs (Personal Computers), laptop PCs, wearable devices such as a wrist watch or an HMD (Head Mounted Display), and/or other devices. Multiple users may be gathered in one or more microlocations. A microlocation may include one or more of a cruise ship, a theme park, and/or other locations. Users at a given microlocation may have a unique augmented reality experience that may be specific to the microlocation. In some implementations, interaction of one or more users with an augmented reality experience may impact interaction of one or more other users with the augmented reality experience. In some implementations, the impact and/or other experiences may be based on one or more of individualized user preferences of each user, system settings, and/or information.

In some implementations, the system may include one or more servers, and/or other components. The one or more servers may be configured to communicate with one or more client computing devices according to a client/server architecture. The users of system may access system and/or augmented reality experiences via client computing devices(s). Server(s) may be configured to execute one or more computer program components. The computer program components may include one or more of an experience component, an orientation component, a position component, a presentation component, an interaction and/or other components.

The experience component may be configured to manage and/or store augmented reality experience information. Augmented reality experience information may include one or more of information defining augmented reality objects, associations between augmented reality objects and real-world locations, and/or other information. Real-world locations may include one or more visual landmarks, markers, and/or other features. One or more augmented reality objects may be associated with one or more real-world locations. One or more features of an augmented reality object may be associated with one or more visual landmarks and/or markers of an associated real-world location.

Associations between augmented reality objects and real-world locations may be available within a repository of associations between augmented reality objects and real-world locations. The repository may be available via the system and/or available on a third party device, which may be accessible and/or available via the system. By way of non-limiting illustration, augmented reality experience information may include a first augmented reality object, an association of the first augmented reality object with a first real-world location, second augmented reality object, an association of the second augmented reality object and a second real-world location, and/or other information.

The experience component may be configured to obtain requests for augmented reality experiences from client computing devices and/or other entities. The experience component may be configured to obtain requests for augmented reality experiences from the system and/or from the third party device, which may be accessible and/or available via the system. Requests may include identifications of real-world locations of client computing devices, and/or other information. In some implementations, responsive to obtaining requests, experience component may be configured to grant requests by accessing and/or querying augmented reality experience information, or deny the requests by taking no further action.

By way of non-limiting illustration, the experience component may be configured to obtain a first request for a first augmented reality experience from a first client computing device at a first real-world location, and/or other requests. The experience component may be configured to identify, from augmented reality experience information, the first augmented reality object based on the first request. The experience component may be configured to obtain a second request for a second augmented reality experience for the first client computing device at a second real-world location. The experience component may be configured to identify, from augmented reality experience information, a second augmented reality object based on the second request.

The orientation component may be configured to obtain view information generated by individual client computing devices, and/or other information. The view information may include one or more of visual information generated by individual image sensors of the individual client computing devices, orientation information generated by individual sensors of the individual client computing devices, motion information generated by individual sensors of the individual client computing devices, and/or other information. An image sensor of a given client computing device may be configured to generate visual output signals conveying visual information within the field of view of the image sensor. Visual information may include one or more of an image, a video, and/or other visual information. When a real-world object is within the field of view of the image sensor, visual information may include one or more of an image, a video, and/or other visual information regarding the real-world object. The image sensor may include one or more of a charge-coupled device sensor, an active pixel sensor, a complementary metal-oxide semiconductor sensor, an N-type metal-oxide-semiconductor sensor, and/or other image sensors. By way of non-limiting illustration, orientation component may be configured to obtain first view information generated by a first client computing device.

The position component may be configured to determine augmented reality experiences, and/or other information.

Determining augmented reality experiences may include determining features of one or more augmented reality objects, and/or other information. Features of augmented reality objects may include one or more of position, size, shape, and/or other features of augmented reality objects. The position component may be configured to determined features based on view information obtained by orientation component, and/or other information. By way of non-limiting illustration, determining features of augmented reality objects based on view information may comprise detecting visual landmarks and/or markers within visual information. For example, position component may obtain information related to features of augmented reality objects that may be associated with detected visual landmarks and/or detected visual markers.

By way of non-limiting example, position component may be configured to determine a first augmented reality experience. The first augmented reality experience may include a first augmented reality object, and/or other objects. Determining the first augmented reality experience may include determining features of the first augmented reality object, and/or other objects. The first augmented reality experience may be determined by first view information obtained by orientation component.

The presentation component may be configured to effectuate presentation of augmented reality experiences determined by the position component. The presentation component may be configured to overlay instances of augmented reality objects onto visual information obtained by the orientation component. Presentation component may be configured to present individual augmented reality objects based on determined features of individual augmented reality objects (e.g., via position component).

The interaction component may be configured to facilitate interaction between users and one or more augmented reality objects. In some implementations, interaction may be facilitated by user input via individual client computing devices. The interaction component may be configured to obtain user input via one or more client computing device(s) associated with the users. In some implementations, user input may include requests for effectuating one or more actions of one or more augmented reality objects. The user input may comprise one or more of a gesture input received through an image sensor of a client computing device, a voice input received through a microphone of a client computing device, a touch input received through a touch-enabled display of a client computing device, and/or other user input.

The interaction component may be configured to effectuate one or more actions or one or more augmented reality objects in response to the user input and/or requests. In some implementations, actions of an augmented reality object may include one or more of a display of the augmented reality object, a display of additional information about the augmented reality object, modifying one or more features of the augmented reality object, and/or other actions. In some implementations, modifying features may include one or more of enlarging or reducing a size of an augmented reality object, changing the display direction and/or orientation of the augmented reality object, and/or other actions. In some implementations, associations between user inputs and actions of one or more augmented reality objects may be stored in an electronic information repository, and/or other storage location.

By way of non-limiting illustration, a user may be presented with an instance of first augmented reality object via a client computing device associated with the user. The user may perform a wave hand gesture in front of the client computing device. The wave gesture may cause one or more sensors of the client computing device to generate output signals conveying information about the wave gesture. The output signals may be obtained by the interaction component. The output signals conveying information about the wave gesture may be associated with a first action. The interaction component may be configured to determine the first action and/or effectuate the first action. By way of non-limiting illustration, the first action may include enlarging a size of an augmented reality object. The interaction component may be configured to display an enlarged instance of the first augmented reality object on the client computing device in response to the user's wave hand gesture.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
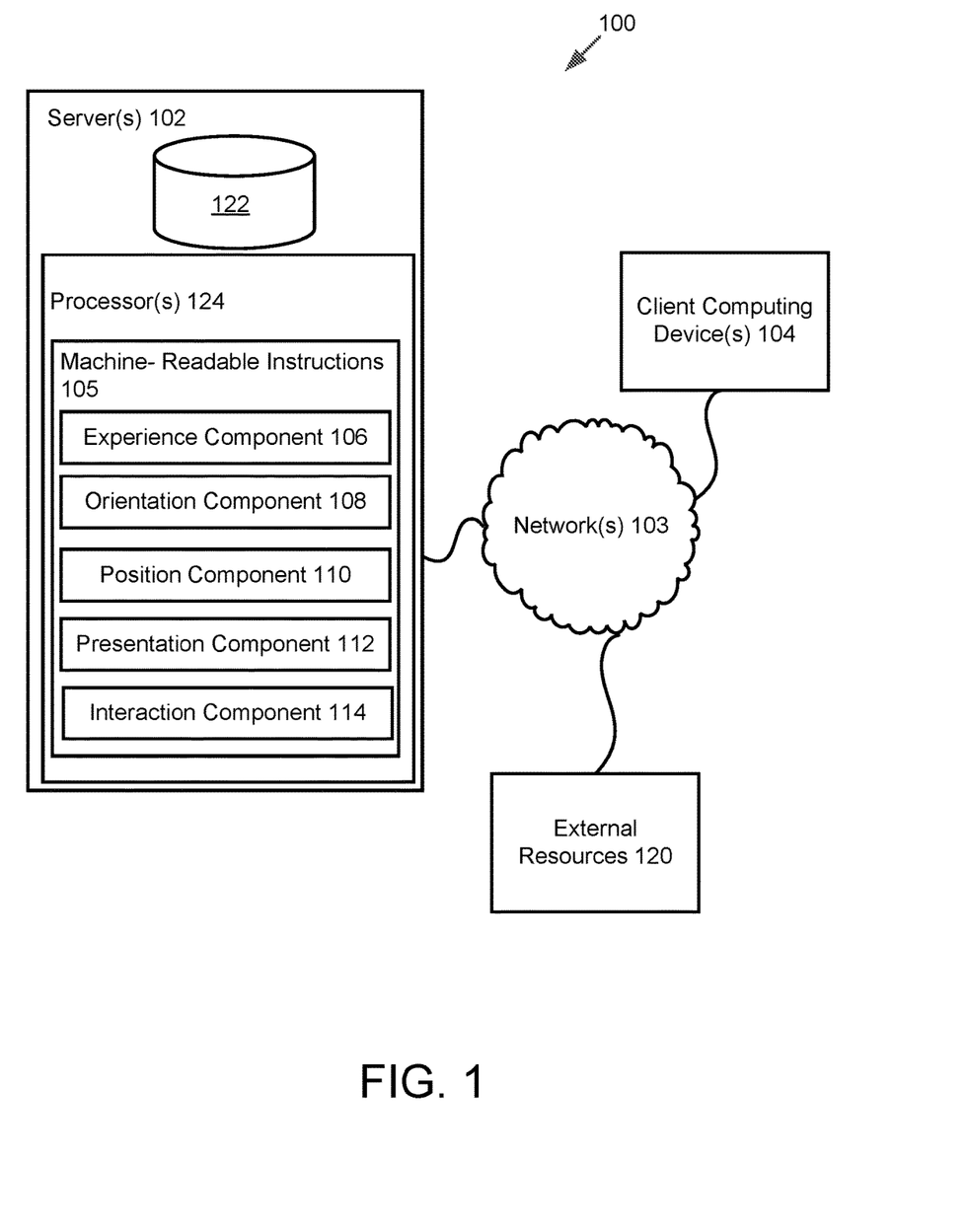
FIG. 1 illustrates an augmented reality system, in accordance with one or more implementations.

FIG. 1 illustrates an augmented reality system 100, in accordance with one or more implementations. As is illustrated in FIG. 1, system 100 may include one or more of one or more servers 102, one or more client computing devices 104, and/or other components. Server(s) 102 may be configured to communicate with one or more client computing device(s) 104 according to a client/server architecture. The users of system 100 may access system 100 via client computing devices(s) 104 associated with the users. Server(s) 102 may include one or more physical processors 124, and/or other components. The one or more physical processors 1254 may be configured by machine-readable instructions 105. Executing the machine-readable instructions 105 may cause server(s) 102 to facilitate generating augmented reality experiences. Machine-readable instructions 105 may include one or more computer program components. The computer program components may include one or more of experience component 106, orientation component 108, position component 110, presentation component 112, interaction component 114 and/or other components.

A repository of augmented reality objects may be available via system 100 and/or server(s) 102 (e.g., stored within electronic storage 122 and/or other storage location). The repository of augmented reality objects may be a data structure configured to store information defining augmented reality objects. The repository of augmented reality objects may comprise a computer readable medium. In some implementations, a data structure configured to store information defining augmented reality objects may store executable instructions (e.g., programming code) that may be configured to generate views of the augmented reality objects. The data structure configured to store information defining augmented reality objects may be a single database or multiple databases. In some implementations, different executable instructions stored in a data structure may perform different functions. For example, different functions may include one or more of shading, texturing, lighting, and/or other functions.

In some implementations, individual augmented reality objects and/or groups of augmented related objects may be associated with functionality. Functionality may include one or more of storytelling, game playing, question and answering, quizzing, teaching, and/or other functionality that may enhance a user's experience with an augmented reality object.

In some implementations, client computing device(s) 104 may include one or more of a head-mounted display, an optical head-mounted display, a see-through display, an optical see-through display, a video see-through display, a visor, eyeglasses, sunglasses, a smartphone, a tablet, a mobile device, a projector, and/or other displays. In some implementations, an image sensor and/or other sensors may be carried on client computing device(s) 104. An image sensor of a given client computing device may be configured to generate visual output signals conveying visual information within a field of view of the image sensor. Visual information may include one or more of an image, a video, and/or other visual information. A field of view of an image sensor may be a function of a position and an orientation of a client computing device. Client computing device(s) 104 may be configured to display instances of augmented reality objects overlaid on visual information. Other sensors may include one or more of GPS, orientation sensors, motion sensors, light sensors, and/or other sensors.

A given client computing device(s) 104 may include one or more of one or more processors configured by machine-readable instructions, and/or other components. Machine-readable instructions of a client computing device may include computer program components. The computer program components may be configured to enable a user associated with the given client computing device(s) 104 to interface with system 100 and/or external resources 120, and/or provide other functionality attributed herein to client computing device(s) 104 and/or server(s) 102.

Figure 2:
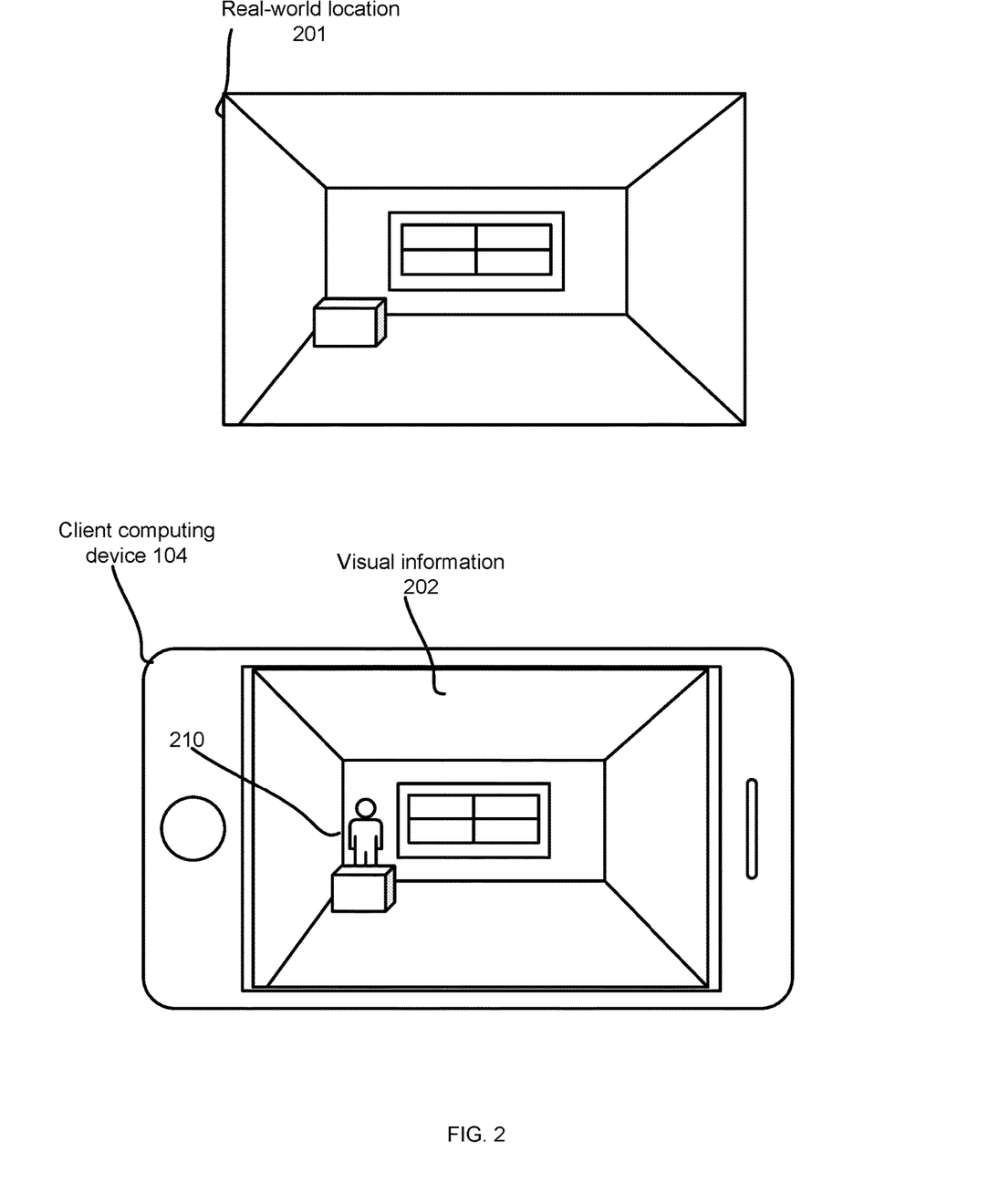
FIG. 2 illustrates exemplary augmented reality object overlaid on visual information associated with client computing device, in accordance with one or more implementations.

By way of non-limiting illustration in FIG. 2, client computing device(s) 104 may include one or more sensors. The one or more sensors may be configured to generate output signals conveying one or more of location information, orientation information, motion information, and/or other information. Client computing device(s) 104 may be configured to determine, from the output signals, one or more of a real-world location 201, orientation information, visual information 202, and/or other information. Client computing device(s) 104 may be configured to present an augmented reality object 210 overlaid on visual information 202, and/or perform other functions. Determination of real-world location 201 may be based on one or more of signal strength, GPS, receipt of real-world location from server 106, and/or other input. Orientation information may be determined based on one or more of information provided by sensors onboard of client computing device, sensors positioned apart from client computing device(s) 104, and/or other sources. Visual information 202 may be conveyed by one or more image sensors carried by client computing device(s) 104. The one or more image sensors may capture visual information 202 present in a field of view of the one or more images sensors.

Referring back to FIG. 1, experience component 106 may be configured to manage and/or store augmented reality experience information, and/or other information. Experience component 106 may be configured to manage associations between augmented reality objects and real-world locations. One or more augmented reality objects may be associated with one or more real-world locations. Associations between augmented reality objects and real-world location may be one or more of one-to-one, many-to-one, one-to-many, many-to-many, and/or other associations. Individual real-world locations may include one or more visual landmarks and/or markers. One or more features of an individual augmented reality objects may be associated with one or more landmarks and/or markers of an associated real-world location. By way of non-limiting illustration, augmented reality experience information may include one or more of a first augmented reality object, an association of the first augmented reality object with a first real-world location, second augmented reality object, an association of the second augmented reality object and a second real-world location, and/or other information.

Augmented reality objects and real-world locations may be available within the repository of augmented reality objects and real-world locations available via system 100 and/or available on a third party device, which may be accessible and/or available via system 100. Experience component 106 may be configured to obtain requests for augmented reality experience from a client computing device and/or other entities. Experience component 106 may be configured to obtain requests for augmented reality experience from system 100 and/or from the third party device, which may be accessible and/or available via system 100. Requests may include identifications of real-world locations of client computing devices, and/or other information. In response to obtaining request, experience component 106 may be configured to either grant or deny the requests. Granting a request may include accessing and/or querying augmented reality experience information, and/or other functions.

By way of non-limiting illustration, experience component 106 may be configured to obtain a first request for a first augmented reality experience. The first request may be obtained from one or more of a first client computing device at a first real-world location, system 100, and/or other entities. The first request may identify the first real-world location and/or other locations. In response to granting the first request, experience component 106 may be configured to identify, from augmented reality experience information, the first augmented reality object based on the first real-world location identified in the first request.

Experience component 106 may be configured to obtain a second request for a second augmented reality experience for the first client computing device at a second real-world location. Experience component 106 may be configured to identify a second augmented reality object based on the second request for the second augmented reality experience for the first client computing device at a second real-world location.

In some implementations, one or more requests for a given augmented reality experiences may be denied in response to one or more requests for the given augmented reality experience being granted (e.g., augmented reality information being accessed and/or queried). By way of non-limiting illustration, experience component 106 may be configured to obtain a first request for a first augmented reality experience from a first client computing device at a first real-world location. The experience component 106 may be configured to identify, from augmented reality experience information, a first augmented reality object based on the first request. The experience component 106 may be configured to obtain a second request for the first augmented reality experience for a second client computing device at the first real-world location. Experience component 106 may be configured to recognize that the first request for the first augmented reality experience from the first client computing device at the first real-world location has been received and the first augmented reality object has been identified (e.g., the first request was granted). In that event, the experience component 106 may be configured to deny the second request.

In some implementations, multiple requests for the same experience may be granted. By way of non-limiting illustration, experience component 106 may be configured to obtain a first request for a first augmented reality experience for a first client computing device at the first real-world location. Experience component 106 may be configured to obtain a second request for the first augmented reality experience for a second client computing device at the first real-world location. The experience component may be configured to identify the first augmented reality object based on the first request and the second request. That is, the second request may not be denied. In some implementations, the first client computing device and second client computing device may be presented the same or different instances of the first augmented reality object.

In some implementations, multiple requests for a given augmented reality experience may be granted regardless of the real-world location identified in the requests. By way of non-limiting illustration, experience component 106 may be configured to obtain the first request for the first augmented reality experience for a first computing device at the first real-world location. The experience component 106 may be configured to obtain a second request for the first augmented reality experience for a second computing device at a second real-world location. The experience component 106 may be configured to identify the first augmented reality object based on both the first request and second request. That is, the first augmented reality object may be identified even though the second request is associated with the second real-world location and not the first real-world location.

Figure 3A:
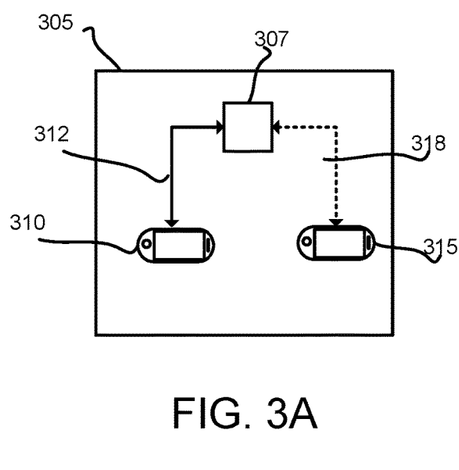
FIG. 3A illustrates exemplary requests by two client computing devices for the same augmented reality experience at the same real-world location, wherein only one computing devices is presented with an augmented reality object, in accordance with one or more implementations.

FIGS. 3A-4C provide non-limiting examples of requests for a shared augmented reality experience from different client computing devices at the same and/or different real-world location. In FIG. 3A, a user associated with client computing device 310 and a user associated with client computing device 315 may both enter real-world location 305. Client computing device 310 may request augmented reality experience 312 at real-world location 305. System 100 may identify augmented reality object 307 associated with real-world location 305 based on augmented reality experience request 312 from client computing device 310. Client computing device 315 may request augmented reality experience 318 at real-world location 305 at the same time as client computing device 310 is requesting augmented reality experience 312. System 100 may deny client computing device 315 request for augmented reality experience 318 at real-world location 305.

Figure 3B:
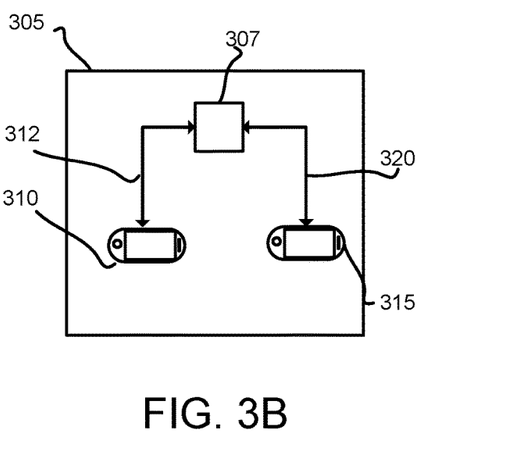
FIG. 3B illustrates exemplary requests by two client computing devices for the same augmented reality experience at the same real-world location, wherein both client computing devices are presented with an augmented reality object, in accordance with one or more implementations.

In FIG. 3B, in response to augmented reality experience request 312 by client computing device 310 and augmented reality experience request 318 by client computing device 315 at real-world location 305, system 100 may identify augmented reality object 307. That is, both augmented reality experience request 312 and augmented reality experience request 318 may be granted.

Figure 3C:
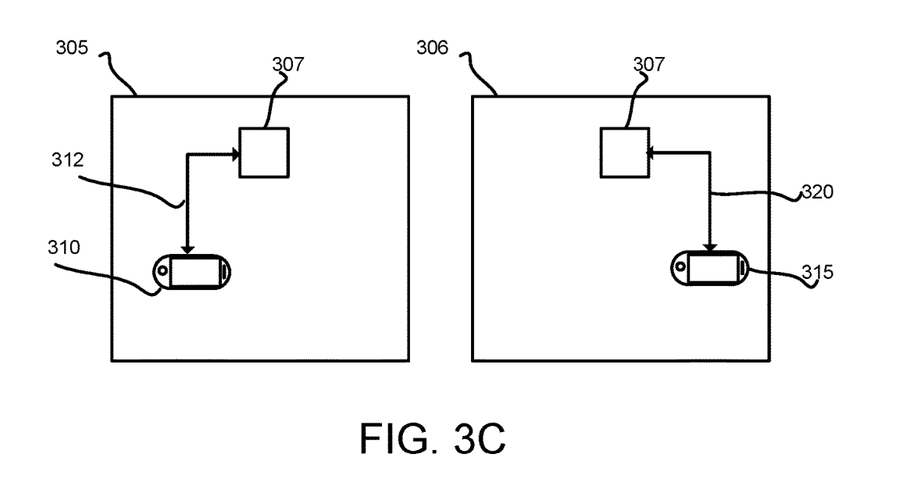
FIG. 3C illustrates exemplary requests by two client computing devices for the same augmented reality experience at two different real-world locations, in accordance with one or more implementations.

In FIG. 3C, client computing device 310 may 310 may request augmented reality experience 312 at real-world location 305 while client computing device 315 may request augmented reality experience 318 at real-world location 306. System 100 may identify augmented reality object 307 in response to augmented reality experience request 312 for client computing device 305 at real-world location 305 and/or augmented reality experience request 318 for client computing device 315 at real-world location 306.

Referring back to FIG. 1, orientation component 108 may be configured to obtain view information generated by individual ones of client computing device(s) 104. The view information may include one or more of visual information generated by individual image sensors of the individual client computing devices, orientation information generated by individual sensors of the individual client computing devices, motion information generated by individual sensors of the individual client computing devices, and/or other information. An image sensor of client computing device(s) 104 may be configured to generate visual output signals conveying visual information within the field of view of the image sensor. Visual information may include one or more of an image, a video, and/or other visual information. When a real-world object (e.g., a visual landmark and/or marker) may be within the field of view of the image sensor, visual information may include one or more of an image, a video, and/or other visual information regarding the object. The image sensor may include one or more of a charge-coupled device sensor, an active pixel sensor, a complementary metal-oxide semiconductor sensor, an N-type metal-oxide-semiconductor sensor, and/or other image sensors. The real-world object may be detectable within visual information, real-world object detection may be facilitate by one or more object recognition techniques. Object recognition techniques may include one or more of SURF, SIFT, computer vision, and/or other techniques.

Orientation component 108 may be configured to obtain orientation output signals conveying motion and/or orientation information of client computing device(s) 104. Orientation component 108 may be configured to obtain onboard sensor signals and/or motion output signals conveying motion and/or orientation information of client computing device(s) 104. Motion of client computing device(s) 104 may include one or more of movement of client computing device(s) 104, change in position of client computing device(s) 104, and/or other motion of client computing device(s) 104 at a time or over a period of time. Orientation of client computing device(s) 104 may include one or more of yaw, pitch, and/or roll of client computing device(s) 104, change in yaw, pitch, and/or roll of client computing device(s) 104, and/or other orientation of client computing device(s) 104 at a time or over a period of time.

Orientation component 108 may be configured to detect real-world objects based on visual information and/or other information. An real-world environment within a field of view of an image sensor may include one or more visual landmarks, markers, and/or other real-world objects. A visual marker may include any object within the field of view of the of the image sensor of client computing devices 104. In some implementations, orientation component 108 may be configured to determine users' real-world location based on the detection of the real-world objects. For example, a real-world object may be inextricably associated with a given real-world location. By way of non-limiting illustration, detection of the Statue of Liberty may facilitate determining a user's real-world location being Liberty Island, and/or other location.

Orientation component 108 may be configured to detect visual markers based on the visual information sensor. A real-world environment may include one or more visual markers. A visual marker may include things that facilitate determination of a position and/or an orientation of a corresponding landmark and/or user. For example, visual markers may include one or more of a label on or near the landmark, a sticker on or near the object, an augmented reality marker on or near the landmark and/or other visual markers. Detection of a visual marker may include identification of the visual marker and/or the corresponding object. Orientation component 108 may determine users' real-world location based on the detection of the visual marker.

In some implementations, visual landmarks and/or markers may be enabled for wireless communication. By way of non-limiting illustration, individual landmarks and/or markers may include RFIDs and/or other components. In some implementations, identification of a visual marker may further facilitate orientation component 108 effectuating communication with the visual marker and/or the corresponding landmark to facilitate the identification of the visual marker and/or the corresponding landmark. Communication may include wireless communication. By way of non-limiting example, wireless communication may include one or more of radio communication, Bluetooth communication, Wi-Fi communication, cellular communication, infrared communication, or other wireless communication.

By way of non-limiting illustration, orientation component 108 may be configured to obtain first view information, and/or other information. First view information may include one or more of first visual information generated by an image sensor of a first computing device, first orientation information, first motion information, and/or other information. Orientation component 108 may be configured to detect visual landmarks and/or visual makers.

Figure 4A:
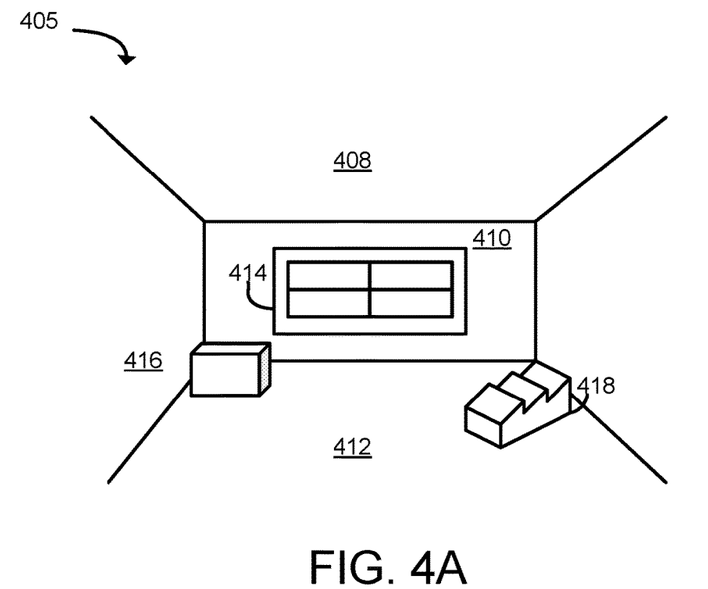
FIG. 4A illustrates a real-world location within a field of view of a client computing device, in accordance with one or more implementations.
Figure 4B:
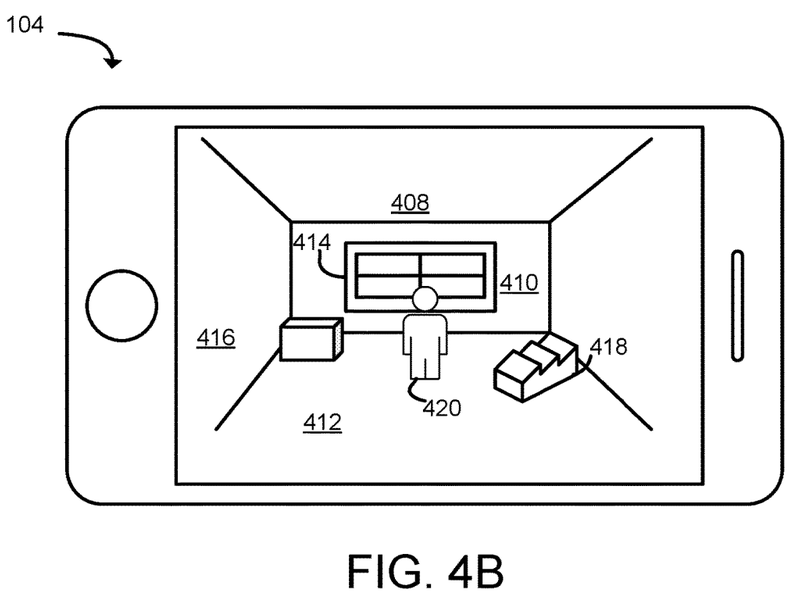
FIG. 4B illustrates an instance of an augmented reality objected overlaid on a visual information associated with client computing device, in accordance with one or more implementations.

For example, FIG. 4A-4B illustrates an example of real-world location 405 within a field of view of client computing device(s) 104. In FIG. 4A, real-world location 405 may include one or more of ceiling 408, wall 410, floor 412, and other visual landmarks. Floor 412 may include one or more of chest 416, staircase 418, and/or other objects. Wall 410 may include window 414 and/or other objects. One or more of ceiling 408, wall 410, floor 412, window 414, chest 416, and/or staircase 418 may include one or more visual markers. Orientation component 108 may detect ceiling 408, wall 410, floor 412, window 414, chest 416, and/or staircase 418 as visual landmarks. Orientation component 108 may detect one or more of ceiling 408, wall 410, floor 412, window 414, chest 416, and/or staircase 418 as visual markers. Orientation component 108 may determine that the user is in the southern end of the living room based on the detection of ceiling 408, wall 410, floor 412, window 414, chest 416, and/or staircase 418 and/or detection of visual markers associated with ceiling 408, wall 410, floor 412, window 414, chest 416, and/or staircase 418. In FIG. 4B, client computing device(s) 104 may display ceiling 408, wall 410, floor 412, window 414, chest 416, and/or staircase 418 based on orientation component 108 detecting ceiling 408, wall 410, floor 412, window 414, chest 416, and/or staircase 418.

Referring back to FIG. 1, position component 110 may be configured to determine augmented reality experiences, and/or other information. Determining augmented reality experiences may include determining features of one or more augmented reality objects, and/or other information. Features of augmented reality objects may include one or more of position, size, shape, and/or other features of augmented reality objects. The position component 110 may be configured to determined features based on view information obtained by orientation component 108, and/or other information. By way of non-limiting illustration, position component 110 may be configured to determine a position of an augmented reality object based on the view information generated by the orientation component 108. Position component 110 may be configured to determine a size of an augmented reality object based on the view information generated by the orientation component 108. Position component 110 may be configured to determine a shape of an augmented reality object based on the view information generated by the orientation component 108. For example, the position, size, and/or shape of the augmented reality object may change based on one or more of the client computing device visual information, orientation information, motion information, and detected landmarks and/or visual markers. By way of non-limiting example, position of a given augmented reality object may be configured such that the augmented reality object may be "anchored" in a real-world location regardless of a position and/or orientation of a client computing devices. In some implementations, position of a given augmented reality object may change with a change in position and/or orientation of a client computer device.

Position component 108 may be configured to determine a first augmented reality experience based on the first view information, including the first visual information generated by the image sensor of the computing device associated with the first computing device, the first client computing device orientation information, client computing device motion information, and/or visual landmarks and/or visual makers in the first visual information. Position component 110 may be configured to determine a position of a first augmented reality object, a size of the first augmented reality object, and/or a shape of the augmented reality object based on the view information obtained by orientation component 108. In some implementations, orientation component 108 may be configured to determine augmented reality object features based on visual landmarks and/or visual markers. Position component 110 may obtain features of augmented reality objects that may be associated with detected visual landmarks and/or detected visual markers to a particular real-world location. For example, position component 110 may determine a first feature of an augmented reality object based on visual information obtained by orientation component 108 conveying a first landmark.

Presentation component 112 may be configured to effectuate presentation of augmented reality experiences determined by position component 110. Presentation component 112 may be configured such that presenting augmented reality experiences comprising overlaying one or more instances of an augmented reality object identified by experience component 106 onto at least some of the visual information obtained by orientation component 108. Presentation component 112 may be configured to determine the overlay position and/or overlay orientation of instances of augmented reality objects based on the positions and/or orientations of visual landmarks and/or visual markers determined by position component 110, and/or based on other view information. In FIG. 4B, client computing device(s) 104 may display ceiling 408, wall 410, floor 412, window 414, chest 416, and/or staircase 418 based on orientation component 108 detecting ceiling 408, wall 410, floor 412, window 414, chest 416, staircase 418, and an instance of augmented reality object 420 in front of the window 414 but behind the staircase 418.

Presentation component 112 may include or retrieve information that matches one or more visual landmarks and/or visual markers to an overlay position and/or an overlay orientation for the augmented reality object. Presentation component 112 may determine an overlay position and/or an overlay orientation for the augmented reality object based on a certain distance(s) from one or more visual markers and/or a certain orientation(s) with respect to one or more visual markers. For example, presentation component 112 may determine an overlay position for the augmented reality object to be certain distances in front of, behind, above, below, to the right, and/or to the left of certain visual landmarks and/or visual markers. Presentation component 112 may determine an overlay orientation for the augmented reality object to be at certain orientations with respect to the visual markers, user, and/or client computing device.

In some implementations, requests for shared augmented reality experiences may include different instances of one or more shared augmented reality objects being presented on different client computing devices. In some implementations, requests for shared augmented reality experiences may include shared instances of one or more shared augmented reality objects being presented on different client computing devices. In some implementations, different requests for a given augmented reality experience may be associated with different instances of the same augmented reality object being presented.

By way of non-limiting illustration, presentation component 112 may be configured to overlay a first instance of a first augmented reality object on first visual information included in first view information in response to a first request for augmented reality experience by a first computing device at the first real-world location. Presentation component 112 may be configured to overlay a second instance of the first augmented reality object on second visual information included in second view information in response to a second request for the same augmented reality experience by a second computing device at the first real-world location. The first instance and second instance may be different instances. The first instance and the second instance may be the same instance.

By way of non-limiting illustration, a user associated with a first client computing device may enter a dining room on a cruise ship. The first client computing device may request an augmented reality experience at the dining room location. An augmented reality object identified based on the first computing device's request may be a ghost object, and/or other object. The first client computing device may be presented with an instance of the ghost object that may be overlaid on the visual information included in view information of the first client computing device. A second user associated with a second client computing device may enter the same dining room. The second client computing device may request an augmented reality experience at the dining room location. The augmented reality object identified based on the second client computing device's request may also be the ghost object (e.g., the same instance and/or a different instance). In some implementations, the second client computing device may not be presented with an instance of the ghost object while the first client computing device is being presented with an instance of the ghost object (e.g., request denied).

In some implementations, the second user associated with the second client computing device may enter the same dining room. The second client computing device may request an augmented reality experience at the dining room location. The augmented reality object identified based on the second client computing device's request may be the ghost object. The second client computing device may be presented with a second instance of the ghost object that may be overlaid on the visual information included in view information of the second computing device.

In some implementations, the second user associated with the second client computing device may enter the same dining room as the first user. The second client computing device may request an augmented reality experience at the dining room location. The augmented reality object identified based on the second computing device's request may be a second ghost object. The second computing device may be presented with an instance of the second ghost object that may be overlaid on the visual information included in view information of the second client computing device.

Presentation component 112 may be configured to effectuate presentation of shared augmented reality experiences based on real-world location associated with users. Presentation component 112 may be configured to overlay an instance of an augmented reality object onto the visual information obtained by the orientation component 108. For example, multiple users individually associated with a client computing device may enter an upper deck of a cruise ship. A augmented reality object may be identified as the augmented reality object associated with the upper deck location. Individual ones of client computing device associated on the upper deck of the cruise ship that requests an augmented reality experience may be presented with a shared instance of the augmented reality object.

Presentation component 112 may be configured to effectuate presentation of the augmented reality experience determined by user specified settings. Presentation component 112 may be configured to overlay an instance of an augmented reality object based on the object requested by the user as a setting of system 100. For example, a user may be interested only in being presented with augmented reality objects that are of a given type and/or theme. The user my record this preference as a setting within system 100. The user may enter a real-world location that is associated with augmented reality object that is of a preferred type. The user may be presented with an instance of the augmented reality object upon entering the real-world location without actively requesting an augmented reality experience. By way of non-limiting illustration, requests may be automatically generated in accordance with user preferences.

Presentation component 112 may be configured to effectuate presentation of the augmented reality experiences based on real-world time. Presentation component 112 may be configured to overlay an instance of an augmented reality object based on the real-world time as a setting of system 100. For example, presentation component 112 may be configured to present users with a particular augmented reality object based on a particular time of day. By way of non-limiting example, a user may be presented with an instance of a ghost augmented reality object at midnight, a fairy princess augmented reality object in morning, and/or other augmented reality objects. In some implementations, the user may not request the augmented reality experience.

The interaction component 114 may be configured to facilitate interaction between users and one or more augmented reality objects. In some implementations, interaction may be facilitated by user input via individual client computing devices 104. The interaction component 114 may be configured to obtain user input via one or more client computing device(s) associated with the users. In some implementations, user input may include requests for effectuating one or more actions of one or more augmented reality objects. The user input may comprise one or more of a gesture input received through an image sensor of a client computing device, a voice input received through a microphone of a client computing device, a touch input received through a touch-enabled display of a client computing device, and/or other user input.

The interaction component 114 may be configured to effectuate one or more actions or one or more augmented reality objects in response to the user input and/or requests. In some implementations, actions of an augmented reality object may include one or more of a display of the augmented reality object, a display of additional information about the augmented reality object, modifying one or more features of the augmented reality object, and/or other actions. In some implementations, modifying features may include one or more of enlarging or reducing a size of an augmented reality object, changing the display direction and/or orientation of the augmented reality object, and/or other actions. In some implementations, associations between user inputs and actions of one or more augmented reality objects may be stored in an electronic information repository, and/or other storage location.

In some implementations, interaction component 114 may be configured to store user input. Interaction component 114 may be configured to model future actions of the augmented reality objects using stored user input. Interaction component 114 may be configured to determine or predict what action the augmented reality object may perform in response to user input. For example, in response to a user tapping on display location of an augmented reality object via client computing device(s) 104 associated with the user, a prescribed action may be to provide the user with particular information. This may include, for example, information about nightly cruise entertainment performances. During next interaction between the same user and the same augmented reality object may be such that the augmented reality object may provide the user with information about nightly cruise entertainment events without obtaining user's input (e.g., without waiting for user to tap on a display augmented reality object).

Interaction component 114 may be configured to send user notifications in response to user's real-world location client via client computing device(s) 104 associated with the user. Interaction component 114 may be configured to send a message to user's client computing device 104 informing the user that an augment reality object may be available for interaction at a particular real-world location. Interaction component 114 may be configured to provide communications to elements outside of system 100 including the Internet, e-mail, content providers, and other interactive repository/aggregators (not shown). In some implementations, user may customize which notifications from which augmented reality objects interaction component 114 may send.

By way of non-limiting example, a user may enter an upper deck of a cruise ship and receive a message on user's client computing device that a ghost augmented reality object is available for interaction at an upper deck location. The ghost may be associated with functionality of game playing, e.g., a treasure hunt. Interaction component 114 may be configured to send user notifications of communications sent by the augmented reality object. For example, the ghost may communicate to the user that a treasure hunt token is located under a seat on the upper deck (e.g., as part of the functionality of ghost augmented reality object). User may receive a message on user's client computing device with the details of the treasure hunt. Upon collecting the token, user may tell the ghost via a voice input that the token has been collected. The ghost may communicate to the user that the user is the winner of the treasure hunt game. User may receive a message on user's client computing device regarding the details of the win.

Interaction component 114 may be configured to notify users of other users present in a certain real-world location. Interaction component 114 may be configured to facilitate communication between users in certain real-world locations. Interaction component 114 may be configured to send and receive notifications between users in certain real-world locations. For example, a first user may be interacting with the ghost in the dining room of the cruise ship. The first user may be notified by the ghost that a second user is currently interacting with the ghost in the dining room of the cruise ship. The first user may notify the second user of the first user's intention to re-virtualize and meet in person. The second user may receive a message on user's client computing device. The second user may respond to the first user by sending a message to the first user's client computing device that the second user wishes to remain anonymous and does not wish to meet in person.

In some implementations, augmented reality experiences may be persistent. That is, one or more interactions with instances of one or more augmented reality objects and/or an augmented reality experiences by a given user may be reflected in the interactions with the same or other instances of the one or more augmented reality objects and/or augmented reality experiences by other users. By way of non-limiting illustration, a first user may interact with a first instance of a first augmented reality object in accordance with a first augmented reality experience at a first point in time. The first user's interactions may cause one or more features and/or functionality of the augmented reality object to change. The change may be reflected in the state of the first augmented reality object. A second user may interact with a second instance of the first augmented reality object in accordance with the first augmented reality experience at a second point in time. The second instances of first augmented reality object may reflect changes to first instance of the first augmented reality object by the first user. That is, the second instance may be instantiated based on the state of the augmented reality object determined based on the first users' interaction. This may provide for ongoing persistent interactions across many different users as different points in time.

In some implementations, server(s) 102, client computing device(s) 104, and/or external resources 120 may be operatively linked via one or more electronic communication links. For example, such electronic communication links may be established, at least in part, via a network 103 such as the Internet and/or other networks. It will be appreciated that this is not intended to be limiting, and that the scope of this disclosure includes implementations in which server(s) 102, client computing device(s) 104, and/or external resources 120 may be operatively linked via some other communication media.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing devices. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing devices operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing device(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same client computing device, or processor(s) 124 may represent processing functionality of a plurality of devices operating in coordination. The processor(s) 124 may be configured to execute computer readable instruction components 106, 108, 110, 112, 114 and/or other components. The processor(s) 124 may be configured to execute components 106, 108, 110, 112, 114 and/or other components by software; hardware; firmware; some combination of software, hardware, and/or firmware; and/or other mechanisms for configuring processing capabilities on processor(s) 124.

It should be appreciated that although components 106, 108, 110, 112 and 114 are illustrated in FIG. 1 as being co-located within a single processing unit, in implementations in which processor(s) 124 includes multiple processing units, one or more of components 106, 108, 110, 112 and/or 114 may be located remotely from the other components. The description of the functionality provided by the different components 106, 108, 110, 112 and/or 114 described herein is for illustrative purposes, and is not intended to be limiting, as any of components 106, 108, 110, 112 and/or 114 may provide more or less functionality than is described. For example, one or more of components 106, 108, 110, 112 and/or 114 may be eliminated, and some or all of its functionality may be provided by other ones of components 106, 108, 110, 112 and/or 114. As another example, processor(s) 124 may be configured to execute one or more additional components that may perform some or all of the functionality attributed herein to one of components 106, 108, 110, 112 and/or 114.

Figure 5:
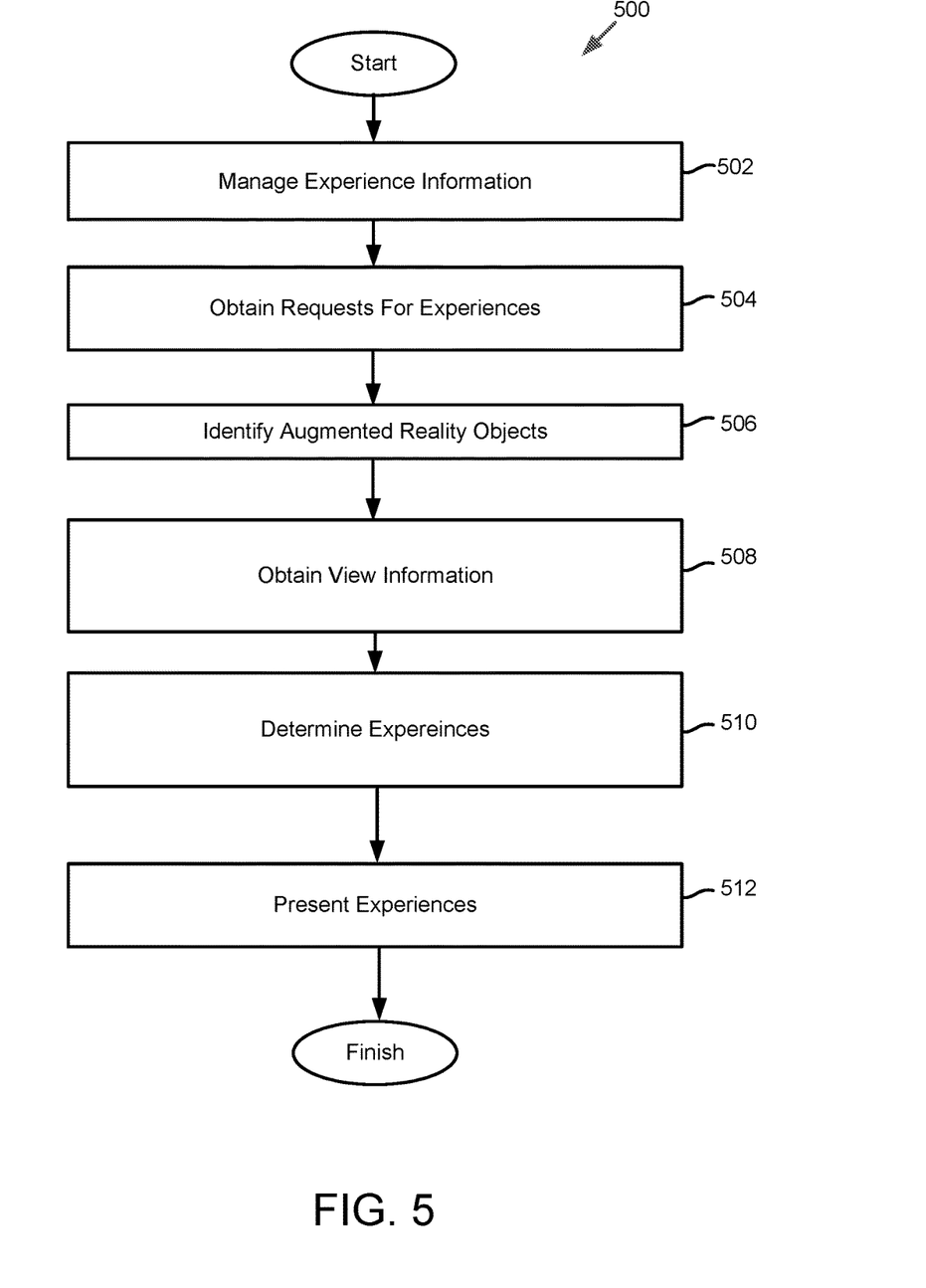
FIG. 5 illustrates a method of providing augmented reality experiences, in accordance with one or more implementations.

FIG. 5 illustrates a method 500 for providing augmented reality experiences, in accordance with one or more implementations. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, experience information may be managed and/or stored. The experience information may associations between augmented reality objects and real-world locations, and/or other information. The experience information may comprise an association between a first augmented reality object and a first real-world location, and/or other associations. In some implementations, operation 502 may be performed by one or more physical processors executing an experience component the same or similar to experience component 106 (shown in FIG. 1 and described herein).

At an operation 504, requests for experiences for users may be obtained. Individual users may be associated with individual computing devices. The requests may comprise identifications of real-world locations of the computing devices associated with the users. The requests may include a first request for a first experience for a first user, and/or other requests. The first user may be associated with a first computing device and/or other computing devices. The first request may identify a first real-world location and/or other real-world locations. In some implementations, operation 504 may be performed by one or more physical processors executing an experience component the same or similar to experience component 106 (shown in FIG. 1 and described herein).

At an operation 506, one or more augmented reality objects associated with the real-world locations included in the requests may be identified from the experience information. By way of non-limiting illustration, the first augmented reality object may be identified for the first request based on the first real-world location. In some implementations, operation 506 may be performed by one or more physical processors executing an experience component the same or similar to experience component 106 (shown in FIG. 1 and described herein).

At an operation 508, view information generated by individual computing devices associated with the users may be obtained. The view information may comprise one or more of visual information computing device location information, orientation information, and/or other information. Visual information may be generated by individual image sensors of individual client computing devices. An image sensor may be configured to generate visual output signals conveying visual information within a field of view of the image sensor. The view information may include first view information obtained from the first computing device. The first view information may include one or more of first visual information, first computing device location and orientation information, and/or other information. In some implementations, operation 508 may be performed by one or more physical processors executing an orientation component the same or similar to orientation component 108 (shown in FIG. 1 and described herein).

At an operation 510, experiences may be determined based on the view information. Such determination may include one or more of size, shape, position and/or other features of augmented reality objects to be included in the experiences. The experiences may include the identified one or more augmented reality objects and at least some obtained visual information associated with individual computing devices. In some implementations, operation 510 may be performed by one or more physical processors executing an position component the same or similar to position component 110 (shown in FIG. 1 and described herein).

At an operation 512, presentation may be effectuated of the determined experiences on individual computing devices. One or more augmented reality objects may be overlaid on visual information associated with individual computing devices. The first experience may be presented on the first computing device and/or other computing devices. The first experience may include an overlay of a first instance of the first augmented reality object on the first visual information included in the first view information, and/or other content. The presentation of the first instance of the first augmented reality object may be determined based on the first computing device location and orientation information, and/or other information. In some implementations, operation 512 may be performed by one or more physical processors executing a presentation component the same or similar to presentation component 112 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. An augmented reality system, comprising:
storage media storing machine readable instructions, and one or more physical processors configured by the machine-readable instructions to:
manage experience information, the experience information comprising associations between augmented reality objects and real-world locations, the experience information comprising an association between a first augmented reality object and a first real-world location;
obtain requests for experiences for users, individual users being associated with individual computing devices, the requests comprising identifications of the real-world locations of the individual computing devices associated with the users, the requests including a first request for a first experience for a first user and a second request for the first experience for a second user, the first user being associated with a first computing device, the first request identifying the first real-world location, the second user being associated with a second computing device, the second request identifying the first real-world location;
identify, from the experience information, one or more augmented reality objects associated with the real-world locations included in the requests, the first augmented reality object being identified based on the first real-world location;
obtain view information generated by the individual computing devices associated with the users, the view information comprising visual information generated by individual image sensors of the individual computing devices, each image sensor being configured to generate visual output signals conveying the visual information within a field of view of each image sensor, and computing device location and orientation information, the view information including first view information obtained from the first computing device, the first view information including first visual information and first computing device location and orientation information;
determine the experiences based on the view information, such determination including one or more of size, shape, and/or position of the identified one or more augmented reality objects, the experiences including the identified one or more augmented reality objects and the visual information associated with the individual computing devices; and effectuate presentation of the experiences on the individual computing devices, such that the identified one or more augmented reality objects are overlaid on the visual information associated with the individual computing devices, the first experience being presented on the first computing device, the first experience including an overlay of a first instance of the first augmented reality object on the first visual information included in the first view information, wherein presentation of the first instance of the first augmented reality object being determined based on the first computing device location and orientation information, and the first experience not being presented on the second computing device; and wherein presentation of the first experience on the second computing device being determined based on whether the first experience is being presented on the first computing device.

2. The system of claim 1, wherein the requests for the experiences are generated by the one or more physical processors.

3. The system of claim 1, wherein the first request is generated by the first user via the first computing device.

4. The system of claim 1, wherein the requests for the experiences include a third request for the first experience from the first computing device at the first real-world location, and wherein presentation of the first experience includes an overlay of a second instance of the first augmented reality object.

5. The system of claim 1, wherein the requests for the experiences includes a third request for a second experience from the first computing device at a second real-world location, wherein the second experience includes a second augmented reality object, and wherein presentation of the second experience includes an overlay of a second instance of the second augmented reality object.

6. The system of claim 1, wherein for the second request for the first experience for the second computing device at the first real-world location, the first experience includes the first augmented reality object, and wherein presentation of the first experience on the second computing device includes an overlay of a second instance of the first augmented reality object.

7. The system of claim 1, wherein the requests for the experiences include a third request for a second experience from the second computing device at the first real-world location, wherein the second experience includes a second augmented reality object, wherein presentation of the second experience includes an overlay of a second instance of the second augmented reality object.

8. The system of claim 1, wherein the requests for the experiences includes a third request for the first experience from the second computing device at a second real-world location, wherein the second experience includes the first augmented reality object, wherein presentation of the first experience at the second computing device includes an overlay of a second instance of the first augmented reality object.

9. The system of claim 1, wherein the first computing device interacts with the first instance of the first augmented reality object through user input at the first computing device, the user input including one or more of a text input, a voice, input, or a gesture input.

10. The system of claim 9, wherein the user input at the first computing device effectuates a first action of the first instance of the first augmented reality object.

11. The system of claim 10, wherein the experiences determination further includes the user input and the first action of the first instance of the first augmented reality object.

12. The system of claim 1, wherein the one or more physical computer processors is further configured by computer readable instructions to:
obtain the users' real world locations;
identify the one or more augmented reality objects associated with the users' real world locations; and
send a notification to the users' individual computing devices to view presentation of the experiences including the identified one or more augmented reality objects at the users' real world locations.

13. A method of presenting augmented reality experiences, the method being implemented by a computing system including one or more physical processors and storage media storing machine-readable instructions, the method comprising:
managing experience information, the experience information comprising associations between augmented reality objects and real-world locations, the experience information comprising an association between a first augmented reality object and a first real-world location;
obtaining requests for experiences for users, individual users being associated with individual computing devices, the requests comprising identifications of the real-world locations of the individual computing devices associated with the users, the requests including a first request for a first experience for a first user and a second request for the first experience for a second user, the first user being associated with a first computing device, the first request identifying the first real-world location, the second user being associated with a second computing device, the second request identifying the first real-world location;
identifying, from the experience information, one or more augmented reality objects associated with the real-world locations included in the requests, the first augmented reality object being identified based on the first real-world location;
obtaining view information generated by the individual computing devices associated with the users, the view information comprising visual information generated by individual image sensors of the individual computing devices, each image sensor being configured to generate visual output signals conveying the visual information within a field of view of each image sensor, and computing device location and orientation information, the view information including first view information obtained from the first computing device, the first view information including first visual information and first computing device location and orientation information;
determining the experiences based on the view information, such determination including one or more of size, shape, and/or position of the identified one or more augmented reality objects, the experiences including the identified one or more augmented reality objects and the visual information associated with the individual computing devices; and
effectuating presentation of the experiences on the individual computing devices, such that the identified one or more augmented reality objects are overlaid on the visual information associated with the individual computing devices, the first experience being presented on the first computing device, the first experience including an overlay of a first instance of the first augmented reality object on the first visual information included in the first view information, wherein presentation of the first instance of the first augmented reality object being determined based on the first computing device location and orientation information, and the first experience not being presented on the second computing device; and wherein presentation of the first experience on the second computing device being determined based on whether the first experience is being presented on the first computing device.

14. The method of claim 13, wherein the first request is generated by the one or more physical processors.

15. The method of claim 13, wherein the first request is generated by the first user via the first computing device.

16. The method of claim 13, wherein the requests for the experiences include a third request for the first experience from the first computing device at the first real-world location, and wherein presentation of the first experience includes an overlay of a second instance of the first augmented reality object.

17. The method of claim 13, wherein the requests for the experiences includes a third request for a second experience from the first computing device at a second real-world location, wherein the second experience includes a second augmented reality object, and wherein presentation of the second experience includes an overlay of a second instance of the second augmented reality object.

18. The method of claim 13, wherein for the second request for the first experience for the second computing device at the first real-world location, the first experience includes the first augmented reality object, and wherein presentation of the first experience on the second computing device includes an overlay of a second instance of the first augmented reality object.

19. The method of claim 13, wherein the requests for the experiences include a third request for a second experience from the second computing device at the first real-world location, wherein the second experience includes a second augmented reality object, wherein presentation of the second experience includes an overlay of a second instance of the second augmented reality object.

20. The method of claim 13, wherein the requests for the experiences includes a third request for the first experience from the second computing device at a second real-world location, wherein the second experience includes the first augmented reality object, wherein presentation of the first experience at the second computing device includes an overlay of a second instance of the first augmented reality object.

21. The method of claim 13, wherein the first computing device interacts with the first instance of the first augmented reality object through user input at the first computing device, the user input including one or more of a text input, a voice, input, or a gesture input.

22. The method of claim 21, wherein the user input at the first computing device effectuates a first action of the first instance of the first augmented reality object.

23. The method of claim 22, wherein the experiences determination further includes the user input and the first action of the first instance of the first augmented reality object.

24. The method of claim 13, wherein the one or more physical computer processors is further configured by computer readable instructions to:

obtain the users' real world locations;

identify the one or more augmented reality objects associated with the users' real world locations; and send a notification to the users' individual computing devices to view presentation of the experiences including the identified one or more augmented reality objects at the users' real world locations.

* * * * *